UNITED STATES PATENT OFFICE.

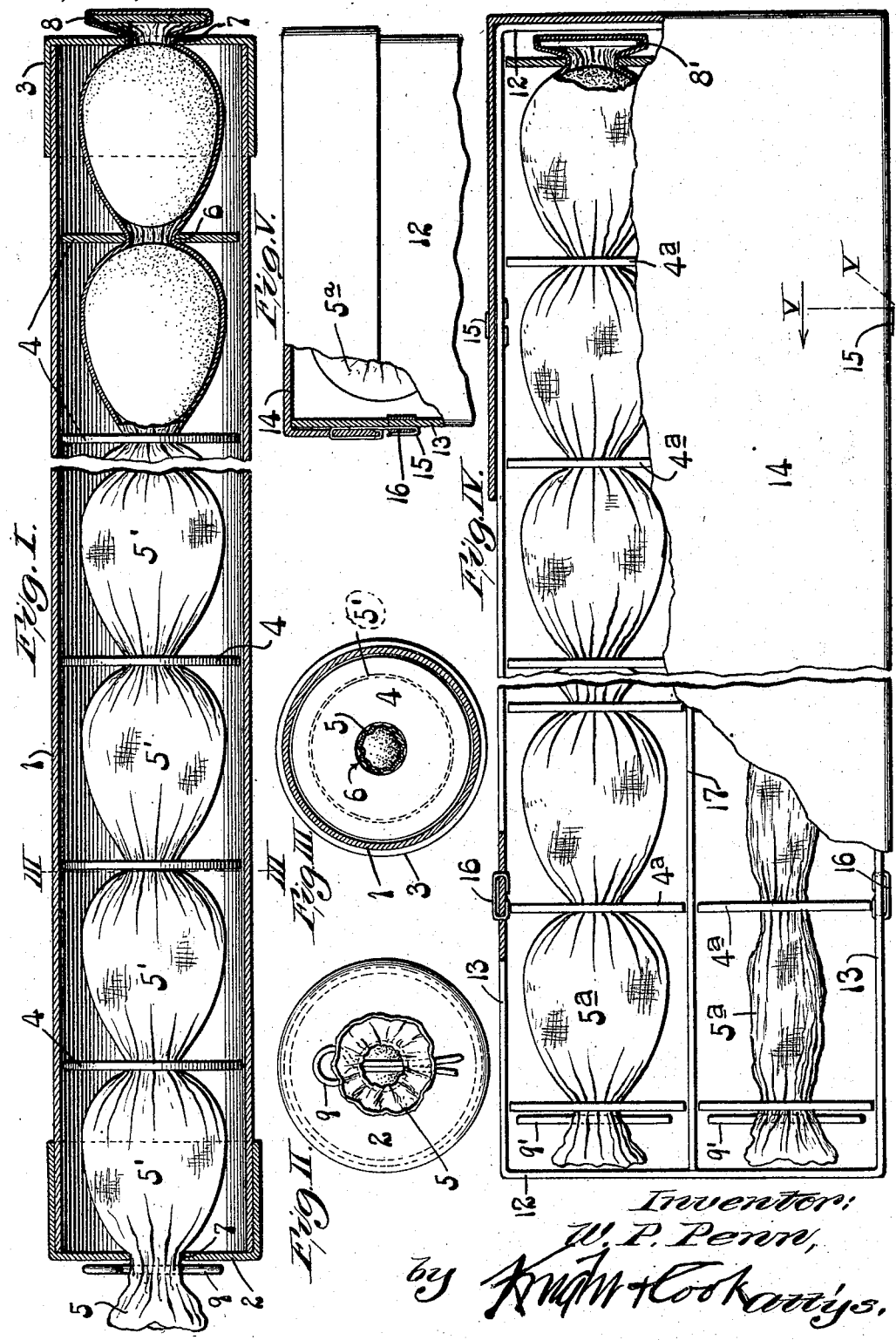

WORDEN P. PENN, OF ST. LOUIS, MISSOURI, ASSIGNOR OF ONE-FOURTH TO ALFRED H. WEHMILLER AND ONE-FOURTH TO JOSEPH W. DAWSON, BOTH OF ST. LOUIS, MISSOURI.

EGG-CONTAINER.

1,185,709.  Specification of Letters Patent.  Patented June 6, 1916.

Application filed May 24, 1915. Serial No. 30,041.

*To all whom it may concern:*

Be it known that I, WORDEN P. PENN, a citizen of the United States of America, a resident of the city of St. Louis, State of Missouri, have invented certain new and useful Improvements in Egg-Containers, of which the following is a full, clear, and exact description, reference being had to the accompanying drawing, forming a part of this specification.

My invention relates to improvements in egg containers, the object being to produce a simple and inexpensive container provided with an egg holding device which is so constructed that the eggs contained therein will not be broken by engaging each other nor by the shocks to which the container is subjected in shipment.

The preferred form of the invention comprises a receptacle provided with egg holders in the form of hammocks, and supporting elements from which the egg holders are suspended. The hammock-like egg holders are preferably made of soft flexible material, such for example as fabric, and the different egg holders are so arranged that the eggs contained therein cannot be damaged by striking each other, nor by striking a part of the receptacle in which the egg holders are suspended.

Figure I is a longitudinal section, partly broken away, illustrating an egg container embodying the features of my invention. Fig. II is an end view of the container shown in Fig. I. Fig. III is a transverse section taken on line III—III, Fig. I. Fig. IV is a plan view, partly broken away, illustrating a modification. Fig. V is a fragmentary end view, partly in section on the line V—V, Fig. IV.

The container shown in Figs. I to III, comprises a long tube 1 and caps 2 and 3 removably fitted to the ends of said tube. Division members 4, arranged with the tube 1, constitute supporting elements for a fabric envelop 5 which preferably passes through perforations 6 in the division members and through perforations 7 in the caps 2 and 3.

8 designates a retaining member arranged in the closed end of the envelop 5, at a point beyond the cap 3; and 9 designates a retaining pin passing through said envelop at a point beyond the cap 2. The retaining members 8 and 9 secure the envelop 5, and at the same time serve as means for securing the caps or closures 2 and 3 to the container.

In filling my egg container, the open end of the envelop 5 is first inserted through the perforation 7 at the center of the cap 3. An egg is then placed in the envelop and thereafter one of the division members 4 is applied to said envelop so as to confine the egg between said division member and the cap 3. The remaining eggs are placed in the envelop, one at a time and the different division members 4 are arranged between the adjacent eggs to separate them from each other. The open end of the envelop is finally inserted through the cap 2 and the retaining pin 9 is applied to said end so as to removably secure the envelop to the tube 1. It will be noted that the envelop is contracted at the division members 4 to provide a series of hammock-like egg holders 5' which lie between the division members. These division members 4 are loosely fitted to the tube 1 and they constitute supporting elements for the hammock-like egg holders, the latter being suspended from the division members. The folds produced by contracting the fabric envelop, at the division members, constitute cushions for the ends of the eggs, and said division members are so arranged that the hammock-like egg holders cannot strike the tube 1.

Various modifications may be made in the form and arrangement of the different elements, for example, a plurality of the envelops may be arranged in a rectangular box as shown in Figs. IV and V. This box is provided with walls 12 and 13 and a closure 14 fitted to said walls. The closure is secured to the box body by means of sheet metal tongues 15 secured to the closure, as shown in Fig. V and passing through loops or keepers 16 on the walls 13. The lower ends of the tongues 15 are folded backwardly over the keepers 16. A partition 17, arranged between the walls 13, divides the box into two compartments.

5ª designates envelops passing through division members 4ª, the latter being confined between the partition 17 and the walls 13. Each envelop 5ª is associated with division members 4ª to provide a series of hammock-like egg holders, and the ends of the envelops are preferably secured by retaining members 8' and 9'.

I claim:—

1. An egg container comprising a tube, caps closing the ends of said tube, each of said caps having an annular flange which surrounds an end portion of the tube, a series of division members arranged in said tube, each of said division members having a central opening and each of said caps being provided with a central opening which registers with the openings in said division members, an envelop passing through all of said openings, one end of said envelop being closed and its opposite end being primarily open to receive the eggs, said envelop being arranged to form a series of egg holders which lie between said division members, a retaining member arranged entirely within the closed end of said envelop at a point outside of one of said caps to prevent said closed end of the envelop from passing through the central opening in said cap, and a retaining pin passing through the opposite end portion of said envelop and fitted to the outer face of the other cap so as to secure all of the parts in their operative positions, the retaining member in the closed end of the envelop being located adjacent to one of said caps and the retaining pin which secures all of the parts, being detachably secured to the envelop.

2. An egg container comprising a receptacle, end members each having an opening, a series of division members arranged between said end members, each of said division members having an opening which registers with the openings in said end members, an envelop passing through all of said openings, only one end of said envelop being permanently closed and its opposite end being primarily open to receive the eggs, said envelop being arranged to form a series of egg holders which lie between said division members, a retaining member arranged entirely within the permanently closed end of said envelop at a point adjacent one of said end members to prevent said closed end from passing through the opening in said end member, and a retaining pin passing through the opposite end portion of said envelop at a point adjacent to the other end member so as to secure all of said parts in their operative positions, the retaining member in the permanently closed end of the envelop being located adjacent to one of said end members, and the retaining pin which secures all of the parts being detachably secured to the other end of the envelope.

WORDEN P. PENN.

Copies of this patent may be obtained for five cents each, by addressing the "Commissioner of Patents, Washington, D. C."